POLYPROPYLENE

INVENTOR
ECKART VON RODA
EWALD TRANKLE

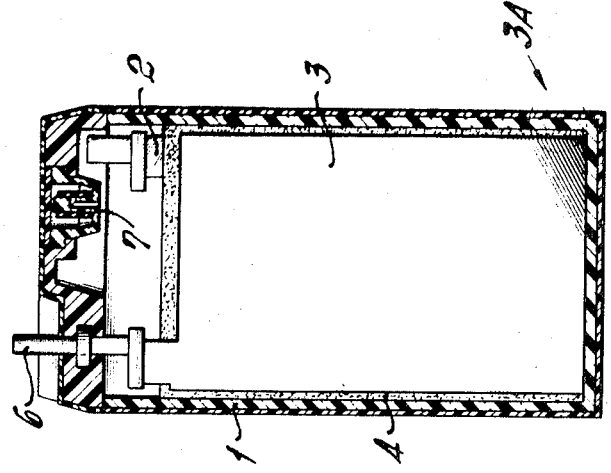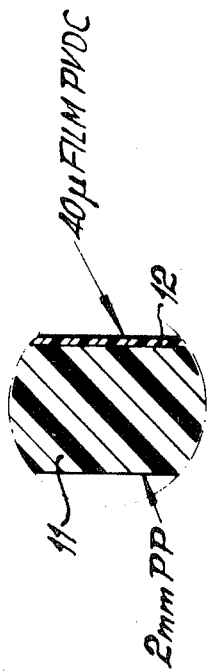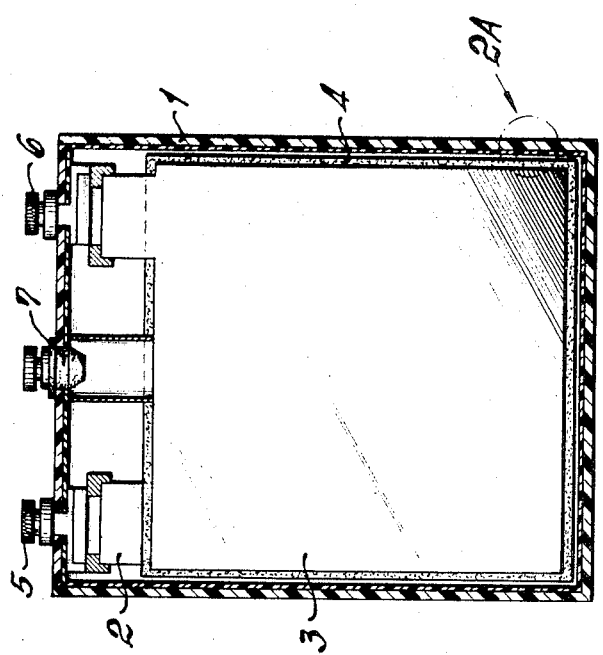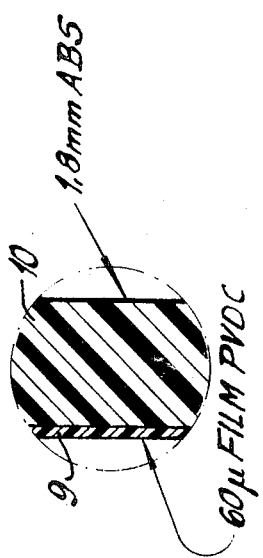

United States Patent Office 3,738,860
Patented June 12, 1973

---

3,738,860
CELL OR BATTERY HOUSING OF SYNTHETIC RESIN FOR MAINTENANCE FREE BATTERIES
Eckart von Roda, Diekholzen, and Ewald Trankle, Backnang, Germany, assignors to Robert Bosch G.m.b.H., Stuttgart, Germany
Filed Mar. 5, 1971, Ser. No. 121,402
Claims priority, application Germany, May 26, 1970,
P 20 25 631.9
Int. Cl. B44d 1/02
U.S. Cl. 117—95      9 Claims

ABSTRACT OF THE DISCLOSURE

For housing a cell or battery, where a maintenance-free lifetime of at least three years is desired and the housing should be of synthetic resin, the water transmission rate of the material of which the housing is constructed—when measured at 20° C. of a film 40 microns thick with a relative humidity at 85% on one side of the film and 0% on the other—must not exceed 10 gm.$^{-2}$d.$^{-1}$, and preferably should not exceed 3 gm.$^{-2}$d.$^{-1}$. The housing may consist of two layers, one of which has a low water-transmission rate and the other of which has a high resistance to mechanical stress.

BACKGROUND OF THE INVENTION

The essential characteristic of a maintenance-free battery is that during its lifetime refilling with electrolyte or with water should not be necessary. This becomes possible when the construction of the cell or battery is such that loss of water is essentially completely eliminated. Under such circumstances, the decrease in the usefulness of the battery is negligible. One reason for the loss of water over the course of time is evaporation through the case material. In a known maintenance-free alkaline nickel-cadmium battery the loss of water is prevented by using a steel housing which is resistant to the action of alkaline electrolyte. Such steel housings are expensive and cannot be used with lead acid batteries since they are not resistant to the sulfuric acid used in these as the electrolyte.

It is known to use acid-resistant synthetic resins for the manufacture of housings for maintenance-free lead-acid batteries, and then to surround the plastic housing with a steel case which not only withstands mechanical stresses but prevents the loss of water by evaporation. Such housings, however, introduce an additional expense in the manufacture and have the disadvantage that they add to the weight of the battery.

The possbility of replacing the combined plastic-steel housing with one consisting only of a plastic has been investigated. By the use of polystyrene as the case material a construction for cylindrical cells has been developed which successfully meets the requirements of strength and leak-tightness. With such cylindrical cells, it has been possible to achieve more than 100 charge and discharge cycles without any decrease in the usefulness of the cells. However, when such cells are subjected to actual use, the loss of water is greater than is the case during experiments performed in the laboratory. The reason is that, for example, 10 cycles in the laboratory will take only about 2 weeks, whereas 10 cycles in practice (for example in the operation of radio equipment) may involve an interval of about one year so that, while the loss of water in 2 weeks in the laboratory is small, the loss over a period of a year becomes substantial and serious. If one calculates from the difference in water vapor losses of 0.5 g. which occur during a 10 cycle period, the loss to be expected over three years, then the resulting value is so high that it appears that such a cylindrical cell will in practice last only for about 2 years.

SUMMARY OF THE INVENTION

It is an object of the invention to develop a cell case or battery case of synthetic resin for maintenance-free cells or batteries, and especially for lead-acid cells or batteries where the water-vapor transmission rate of the synthetic resin is sufficiently low so that a life expectancy of at least three years can be obtained.

This goal can be achieved if the plastic used has a water-vapor transmission rate $q$ (based on a film 40 micron thick, at a temperature of 20° C., with a relative humidity of 85% at one face of the film and 0% at the other face) of not more than 10 gm.$^{-2}$d.$^{-1}$, and preferably not more than 3 gm.$^{-2}$d.$^{-1}$.

Tables are available in the literature which supply the required data for plastics such as polypropylene, polyethylene, polyterephthalic ester or polyvinyl chloride. Such tables are given in "Der Plastverarbeiter" 15 (1964) 427–35.

The values for the transmission rate given above were not calculated but were determined empirically since it is not possible to calculated the water-vapor loss rate directly from the data given in the literature, because a lead-acid cell for instance does not contain pure water but sulfuric acid of higher or lower concentration depending on the state of charge, whereby the rate of evaporation is substantially reduced.

The synthetic material of which the cell case or the battery case is manufactured may consist of a single thickness; in that event the material used for the manufacture of the case is one of those named above, which have water-vapor transmission rates lower than the values specified.

The material may also have two thicknesses the first of which, for example the outer layer, provides resistance to mechanical stress and the second of which, for example the inner layer, determines the water-vapor transmission rate for the assembled system of two layers or thicknesses. In this case it is desirable that the water-vapor transmission rate of the second layer should not be greater than ⅒ and preferably no greater than ¹⁄₁₀₀ of that of the first layer. Infabricating double-layered or double-walled cases of this type it is desirable that the outer, mechanically strong layer be provided with a thin inner film which determines the water-vapor transmission rate and is preferably made of PVDC (polyvinylidine chloride). The outer layer may be of ABS (acrylonitrile-butadiene-styrene).

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 shows in elevational cross-section a flat cell having an outer wall of ABS on the inside of which is coated a thin film of PVDC;

FIG. 2A shows in enlarged scale a portion of the case wall of FIG. 2;

FIG. 3 shows an elevational cross-section of a cell having a case wall of PP on the outside of which is coated a thin film of PVDC; and FIG. 3A shows on an enlarged scale a section of the wall of the case of FIG. 3.

DESCRIPTION OF THE PREFERRED EMBODIMENTS

The following examples illustrate the invention.

Example I

A maintenance-free lead-acid cell of D size (diameter 34 mm., height 62 mm., 2 volts, 1.8 ah.) with a case made of polystyrene 1.2 mm. thick, when used commercially showed a water loss by evaporation of about 0.5 g./year. For a projected life of three years, the water loss would be in the neighborhood of 1.5 g. In normal use in radios, flashlights, tape recorders, etc., the cell can tolerate a loss of water of about 0.8 g. before the electrical properties of the cell are degraded sufficiently to make the cell unsuitable for the applications listed. When the water loss is greater than this value, the internal resistance of the cell increases sharply, and capacity decreases to less than 1.2 ah. This means that such a cell would have an effective life between only about 1 and 1.5 years. The projected life of three years on which basis the other components of the cell are designed, cannot be achieved except by resort to the present invention.

Figure 1:
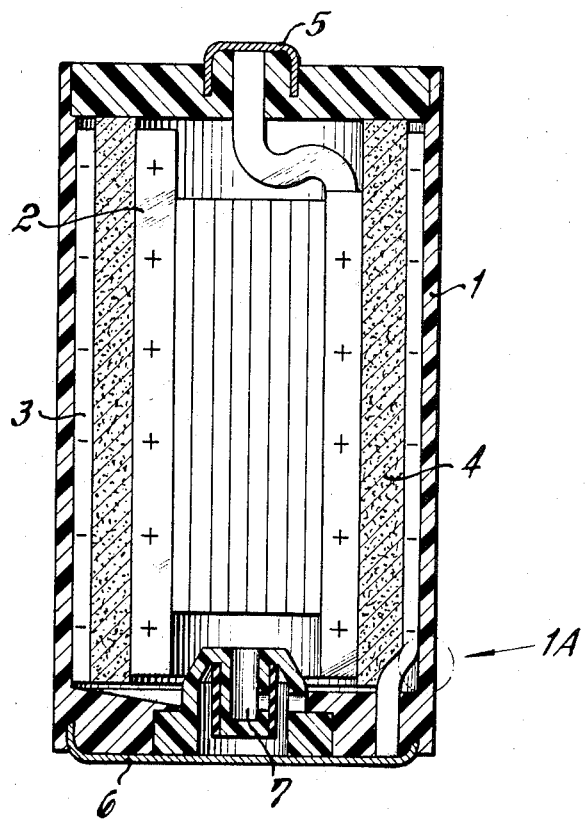
FIG. 1 shows an elevational cross-section of a cylindrical cell having a case of polypropylene.
Figure 1A:
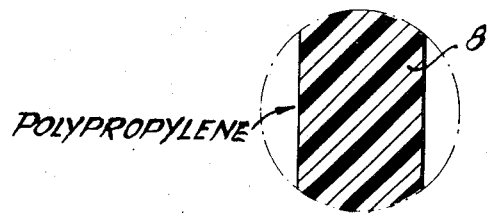
FIG. 1A shows on an enlarged scale a section of the case wall of FIG. 1.

In FIGS. 1 and 1A, the cell housing 1 contains a positive electrode 2 and a negative electrode 3, spaced apart by a separator 4. The positive terminal 5 and the negative terminal 6 provide for passage of current. The cell is vented by the valve 7.

If the housing of the maintenance-free cylindrical cell is made of a plastic such as polypropylene, as shown in FIG. 1, then the rate of water loss by evaporation will be substantially decreased. The type of polypropylene which was investigated has a water-loss rate $q=5$ gm.$^{-2}$d.$^{-1}$ in contrast to that of polystyrene where the rate was 28 gm.$^{-2}$d.$^{-1}$.

In a test in actual use, cells constructed according to our invention showed a water-loss rate of only 0.1 g./year. This means that cells made in this way would, during their projected life of three years, loss only 0.3 g. of water. Consequently, the electrical properties of the cell would remain constant during the entire time and would begin to decrease only when there is exhaustion of the system, as by corrosion of the grid taking place.

Example II

A cell was constructed as shown in FIG. 2. The internal layer of polyvinylidene chloride was deposited from emulsion.

Example III

A maintenance-free lead-acid battery was constructed for use in a flash apparatus so that it is discharged at very high current.

The case was made of polypropylene; because of the space requirements the thickness of the wall could not be greater than 2 mm. Because of the high currents involved, the battery is extremely sensitive to loss of water; for a loss of only 0.4 g. the internal resistance is doubled. Moreover, at this resistance the number of obtainable flashes is cut to 40%. Since the battery in actual use loses about 0.2 g. of water per year, a lifetime of only two years at full capacity can be achieved if it is provided merely with the polypropylene case. However, when the polypropylene case was covered with a 40 micron thick layer of polyvinylidene chloride, as shown in FIG. 3, the rate of water loss of the battery through evaporation fell to 0.13 g./year. The projected life of the battery was thereby increased to 3 years before the loss of water would damage the operability of the battery.

Details of the three types of walls according to the three examples are shown in FIGS. 1A, 2A and 3A. The wall 8 of PP (polypropylene) is shown in FIG. 1A; the 60 micron thick layer 9 PVDC (polyvinylidene chloride) coated on the interior of the ABC wall 10 is shown in FIG. 2A and the 40 micron PVDC coating 12 on the PP wall 11 is shown in FIG. 3A. The PP wall of FIG. 1A provides both strength and resistance to transmission of water vapor. In FIGS. 2A and 3A the thick layer provides the mechanical strength and the PVDC provides the principal resistance to loss of water.

Polypropylene has a tensile strength of 370 kg./cm.$^2$. In many cases a polypropylene housing is not strong enough to retain the overpressure which may develop in a cell. Under such circumstances the walls belly out. A material of higher strength should then be used. An example is ABS (acrylonitrile-butadiene-styrol) where tensile strength of 560 kg./m.$^2$ makes it suitable. However, this material has a water transmission rate of 60 gm.$^{-2}$d.$^{-1}$ which is much too high. If, on the other hand, this material is covered with a 60 micron thick layer of polyvinylidene chloride applied for instance in the form of an emulsion, and having a water vapor transmission rate of 0.18 gm.$^{-2}$d.$^{-1}$, then a cell case is obtained which meets all the requirements. The advantage of the present invention is that a housing is achieved for maintenance-free cells or batteries from materials which have a water-transmission rate low enough to meet the desired lifetime. The cases are simple to manufacture and avoid the necessity for use of steel outer cases, so that the portion of the total battery weight represented by the housing is low.

It will be understood that each of the elements described above, or two or more together, may also find a useful application in other types of applications differing from the types described above.

While the invention has been illustrated and described as embodied in a housing for maintenance-free cells and batteries, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A housing for maintenance-free cells or batteries, comprising a peripheral wall including a first layer consisting of synthetic plastic material having a water transmission rate of at most 10 gm.$^{-2}$d.$^{-1}$, as measured on a film 40 microns thick at a temperature of 20° C., and with a relatively humidity of 85% at one side and 0% at the other side of the film; and a second layer proximal to said first layer and consisting of lightweight synthetic plastic material, said second layer being mechanically stronger than said first layer, and having a water transmission rate greater than said water transmission rate of said first layer, and one of said layers extending over the other of said layers.

2. A housing as defined in claim 1, wherein said water-transmission rate is at most 3 gm.$^{-2}$d.$^{-1}$.

3. A housing as defined in claim 1, wherein said water transmission rate of said first layer is at most $\frac{1}{10}$ of that of said second layer.

4. A housing as defined in claim 1, wherein said water-transmission rate of said first layer is at most $\frac{1}{100}$ of that of said second layer.

5. A housing as defined in claim 1, wherein said first layer is a coating on the inside of said second layer.

6. A housing as defined is claim 1, wherein said first layer is a coating on the outside of said second layer.

7. A housing as defined in claim 1, wherein said first layer is polyvinylidene chloride.

8. A housing as defined in claim 1, wherein the thickness of said second layer is substantially greater than that of said first layer.

9. A housing as defined in claim 1, wherein said lightweight synthetic plastic material is selected from the group consisting of polypropylene, polyethylene, polyterephthalic ester, polyvinyl chloride and acrylonitrile-butadiene-styrene.

References Cited

UNITED STATES PATENTS

| | | | |
|---|---|---|---|
| 3,391,028 | 7/1968 | Orsino | 136—166 |
| 2,995,614 | 8/1961 | Krueger | 136—111 |
| 3,525,639 | 8/1970 | Redmon | 136—166 X |
| 3,433,681 | 3/1969 | Jammet | 136—166 X |
| 3,576,678 | 4/1971 | Kocherginsky et al. | 136—166 |

EDWARD G. WHITBY, Primary Examiner

U.S. Cl. X.R.

117—138.8 R, 138.8 E, 138.8 F; 136—111, 166; 161—231, 253, 254, 255, 256